United States Patent [19]

Staes

[11] 4,028,528

[45] June 7, 1977

[54] CODE SCANNING SYSTEM

[75] Inventor: Daniel Staes, Bretigny sur Orge, France

[73] Assignee: Rapistan, Incorporated, Grand Rapids, Mich.

[22] Filed: Feb. 27, 1976

[21] Appl. No.: 662,005

[30] Foreign Application Priority Data

Feb. 28, 1975 France .......................... 75.06486

[52] U.S. Cl. .................. 235/61.11 E; 235/61.7 R
[51] Int. Cl.² ...................... G06K 7/10; G02B 5/12
[58] Field of Search ............. 360/51; 235/61.11 E, 235/61.11 R, 61.7 R

[56] References Cited

UNITED STATES PATENTS

| | | | |
|---|---|---|---|
| 3,203,530 | 8/1965 | Scriccia et al. | 235/61.7 R |
| 3,227,886 | 1/1966 | Dunigan et al. | 235/61.7 R |
| 3,643,065 | 2/1972 | Dunigan | 235/61.7 R |
| 3,665,430 | 5/1972 | Hinrichs et al. | 360/47 |
| 3,745,354 | 7/1973 | Vargo | 235/61.11 E |
| 3,751,640 | 8/1973 | Daigle et al. | 235/61.11 E |
| 3,794,812 | 2/1974 | Bryant | 235/61.11 E |

*Primary Examiner*—Vincent P. Canney
*Attorney, Agent, or Firm*—Price, Heneveld, Huizenga & Cooper

[57] ABSTRACT

The specification discloses a binary code reading system in which a code strip is formed of spaced retroreflective segments in a reglet and which are selectively blocked by runners to define a binary code. Detectors spaced at intervals corresponding to adjacent segments read the code strip as it passes the detectors which are coupled to an OR gate for developing clock pulses directly from the code strip for each segment being read. One of the detectors is coupled to a storage device having a clock input terminal coupled to the output of the OR gate through a multivibrator for synchronizing the entry of the code into the storage device. The sorted code, read from the code strip on a moving article can be utilized in a conveyor system, for example, for sorting of the article.

13 Claims, 2 Drawing Figures

CODE SCANNING SYSTEM

BACKGROUND OF THE INVENTION

The present invention relates to the optical scanning of a code in series on a reglet and made up of retro-reflected elements at regular intervals. Sliding runners on the reglet each conceal a retro-reflecting mark and by their position indicate the code.

When reading the article code on a tote for transferring articles along a conveyor, the code typically passes a stationary code reader such that the elements making up each code bit occur in time sequence or serial sequence. In order to read the entire code accurately, typically storage means, such as a shift register, are provided which sequentially receives each code bit and stores the bit until the entire code is read and stored. Once this is done, the computer interface or whatever control utilizing the code reads the entire code out in parallel form (i.e., each bit simultaneously).

In order to shift each code bit serially into a storage device such as the shift register, it is necessary that a clock pulse be employed which has the effect of permitting each bit to be read and stored. There exist two generally known ways to generate clock pulses which, of course, must be in precise timed relationship to the code and, therefore, must in some way be related to the code strip carried by the tote. The first manner is to utilize a pulse generator driven by the conveyor which can be utilized since the speed at which the code on the tote passes the detectors is directly related to the conveyor speed. Another method which does not rely on conveyor speed information is to place a separate clock strip on the coded area on the tote. This, of course, requires an additional detector and associated circuitry, plus additional coding elements.

SUMMARY OF THE INVENTION

In general, the invention refers to a procedure of scanning coding positions of a binary code strip by reading the distribution in the spacing of the code positions and also obtaining a timing signal used for clocking the serially read code into a memory. The scanning system includes at least two detectors spaced from one another a distance to simultaneously read adjacent code elements and lying in a plane parallel to the direction of movement of the code strip.

The invention can especially be applied, but not exclusively, to the optical reading of coded reglets carried by moving bodies to be handled for effectively identifying the aforesaid moving bodies.

Other characteristics and advantages of this invention will become apparent from the following description and by reference to the attached drawings in which:

DETAILED DESCRIPTION OF THE PREFERRED EMBODIMENT

The present invention provides a code strip having a single row of elements (code bits) which are capable of generating their own clock pulses such that neither a conveyor operated clock pulse generator nor a separate code strip need be employed. It accomplishes this by utilizing two or more detectors which are physically spaced at the same spacing as the code elements placed on the tote (i.e., tray). It then uses a code system whereby adjacent code elements will always contain a reflective element such that if one blocking slide is employed, two adjacent code reading detectors are employed and one of the code readers will always generate a clock pulse as the code strip passes it. The system can be expanded by using two adjacent blocking strips in which case three code detectors are utilized such that again one code detector will always be reading a light area of the code strip to generate a clock pulse.

By employing such a system and coupling the outputs of the detectors to an "OR" gate, as a code strip passes, each code element of the strip will generate a clock pulse regardless of the positioning of the blocking slides used for programming the code into the strip. Only one of the detectors need be used for actually reading the code which is shifted into a shift register by means of the clock pulses developed at the output of the OR gate.

Figure 1:
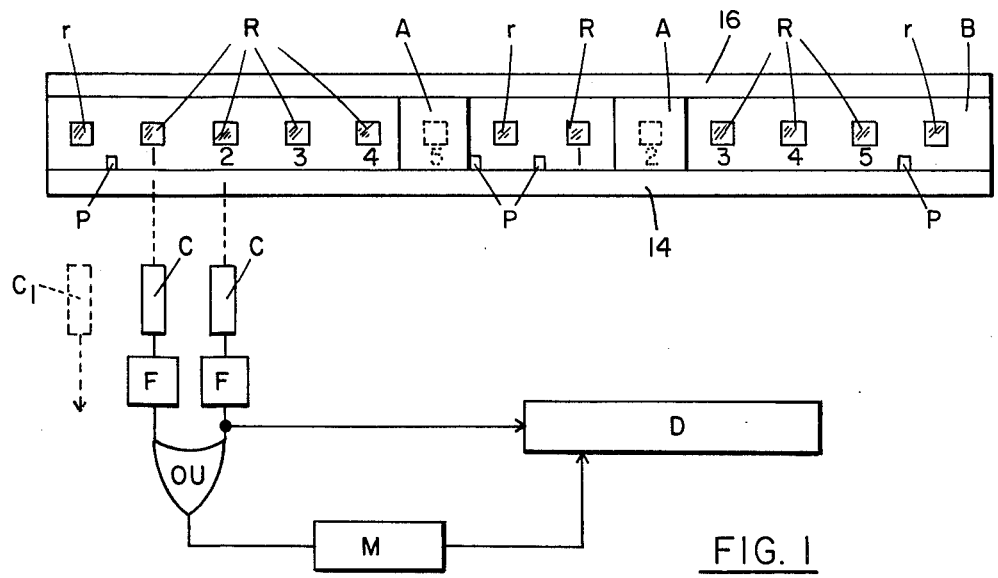
FIG. 1 is a diagram representing a scanning device according to one form of the invention.

In the form of the invention shown in FIG. 1, a code strip includes a plurality of reflective elements R and r mounted to a reglet B in turn positioned on an article. Reglet B is a runner support including a lower edge 14 and an upper ledge 16 between which there is slidably supported runners A. Runners A slidably mounted within the reglet can be moved to selectively block elements R to define a predetermined binary code. The runners A cannot hide the extreme retro-reflective selections r of the reglet B, nor two consecutive retro-reflective selections R (hence two consecutive code positions) since blocking studs P prevent the passage of the runners to obstruct the elements r.

Figure 2:
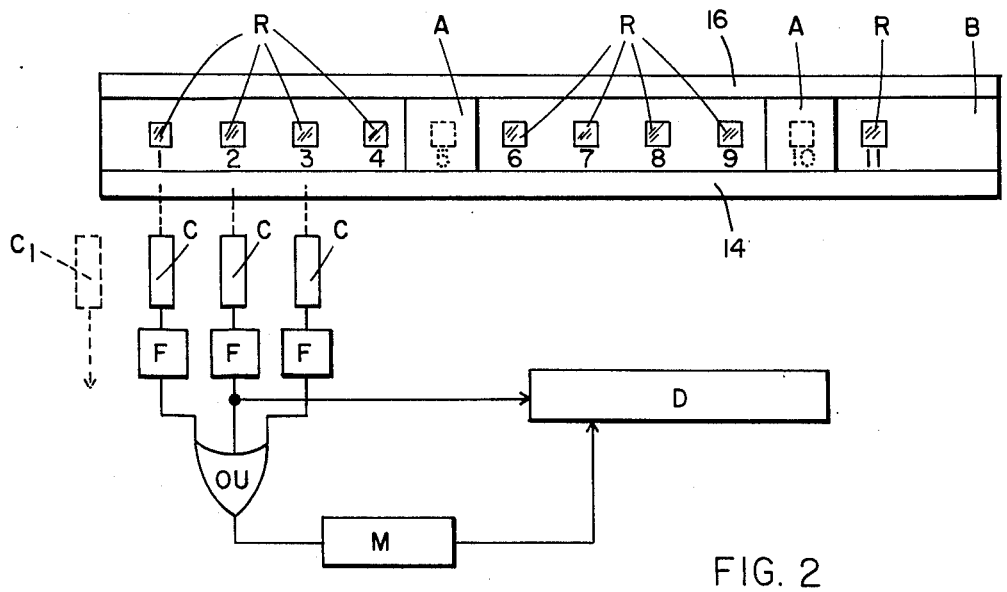
FIG. 2 is a diagram of another form of the scanning device of the invention.

The scanning device used for reading the code strip includes two spaced reflex photoelectric cells C. These cells have their output coupled to the inputs of an OR gate OU through filter circuits F. One of the cells C has its output coupled to the input of a memory circuit D which in the preferred embodiment consists of a shift register. The output of the OR gate is coupled to a monostable multivibrator M having its output coupled to a clock input terminal of the shift register D. In the form of the invention seen in FIG. 2, the scanning device includes three reflex photoelectric cells C, and the runners A are able to hide any retro-reflective selections R.

The cells C in both embodiments have their optical axes parallel to the code strip and are spaced from each other by the same distance separating two successive retro-reflective elements R and their beams normally cut the coded surface of the reglet. In some embodiments, the cell spacing can be different than that of the code element as long as their field of view is directed at successive code elements for simultaneously reading of two or more code elements.

In both embodiments when a reglet passes in front of the scanning device (or vice versa), at least one cell is always found in front of the unhidden retro-reflected code element. Thus, a clock pulse indicating the reading of a new code element is always developed by the OR gate and applied to the shift register D (or its equivalent, programed in case of direct entrance on a computer). The code displayed on the reglet will thus be entered in the aforesaid register at the end of the passage of the reglet, so that one is able to use as a selftimer the signal from the OR gate. The multivibrator M delays the clock pulse slightly and narrows it somewhat so that the shift register will read the code element only during a brief interval near the center of the occurrence of an output pulse from the cell coupled to the input of the register D.

The control function and the outputing of the code entered into the shift register D takes place when a control cell C indicates the end of the passage of the moving body on which is fixed the coded reglet. The output of cell C, in either embodiment, can be applied to a peripheral utilization device such as a diverter control of a sorting conveyor or the like.

The concern of the coded scanning device of the invention rests in the fact that the device is arranged so it can reliably read all the possible codes of the reglet with a limited number of readers at the lowest cost since the electrical circuits are themselves very simple.

It is to be clearly understood that this invention has been described and represented only as a preferred example of the invention and that various modifications to the invention and that various modifications to the preferred embodiment can be made. Thus for example, the code elements and sensors need not be optical. Also the detectors could be moved with code elements stationary. These and other modifications to the preferred embodiments will, however, fall within the scope and spirit of the invention as defined by the appended claims.

The embodiments of the invention in which an exclusive property or privilege is claimed are defined as follows.

1. A code scanning system comprising:
a code strip including a plurality of spaced code elements arranged in a row and selectively obstructed to define a code,
a plurality of detectors positioned in a row aligned to permit serial scanning of said code strip when said code strip and said detectors are moved relative to one another said detectors spaced such that adjacent detectors are simultaneously aligned with adjacent code elements for detecting said code elements,
logic circuit means coupled to said detectors for providing a timing signal in response to the direction of a code element, and
circuit means coupled to one of said detectors and to said logic circuit for receiving signals therefrom representative of a code encoded in said code strip.

2. The system as defined in claim 1 wherein said code strip further comprises a reglet having a row of code elements spaced at regular intervals thereon and at least one slide member slidably positioned in said reglet for selective obstructing a code element for encoding said code strip.

3. The system as defined in claim 2 wherein said code strip includes a plurality of slide members, a number $n$ of which can be positioned adjacent one another to obstruct $n$ adjacent code elements and wherein said system includes $n + 1$ adjacent detectors such that an unobstructed code element will be detected for each position of a code element to generate a timing signal by said logic circuit.

4. The system as defined in claim 3 wherein said code elements comprise reflective members and wherein said detectors include a light detector for detecting light reflected by a reflective code element.

5. The system as defined in claim 4 wherein said logic circuit means includes an OR gate having a plurality of input terminals each of which is coupled to one of said detectors such that said OR gate provides an output signal at an output terminal when any one of said detectors detects a code element.

6. The system as defined in claim 5 wherein said circuit means comprises a shift register having a signal input terminal coupled to one of said detectors, and a clock pulse input terminal coupled to the output of said OR gate.

7. The system as defined in claim 6 and further including a delay circuit coupled between said output terminal of said OR gate and said clock pulse input terminal of said shift register.

8. A system for the sequential scanning and reading of a binary encoded code strip having a plurality of binary code elements of a first or second type comprising:
a plurality of detectors, the number of which exceed the number of successive binary bits of a first type on the code strip by one, said detectors positioned to successively serially scan each element;
an OR gate having a plurality of input terminals with each one of said input terminals coupled to a unique one of said detectors; and
a shift register having a signal input terminal coupled to one of said detectors, and a clock input terminal coupled to the output of said shift register permitting the sequential entry of the detected code into said shift register.

9. The system as defined in claim 8 and further including a monostable multivibrator coupled between said OR gate and said clock input terminal of said shift register to delay the application of a clock pulse to said shift register.

10. A system for the sequential reading of a binary encoded code strip adapted to be positioned on a movable object comprising the combination of:
a code strip including a reglet having a plurality of spaced code elements and at least two slide members slidably mounted within said reglet to obstruct two selected code elements for encoding said code strip with a predetermined binary code,
a pair of detectors spaced a distance corresponding to the distance between code elements on said reglet for providing an output signal in response to the passing of a code element in alignment with said detectors,
an OR gate having first and second inputs coupled to said pair of detectors and an output terminal, and
a shift register having a signal input terminal coupled to one of said detectors and a clock input terminal coupled to the output of said OR gate whereby as the code strip advances past said detectors, clock pulses are generated for each position of a code element for entry of the code into said shift register.

11. The system as applied in claim 10 and further including stop means preventing said at least two slide members from obstructing adjacent code elements.

12. The system as defined in claim 11 and further including a multivibrator coupled between said OR gate and said clock input terminal of said shift register.

13. The system as defined in claim 11 and further including filter means coupled between each of said detectors and the associated input of said OR gate.

* * * * *

UNITED STATES PATENT AND TRADEMARK OFFICE
CERTIFICATE OF CORRECTION

PATENT NO. : 4,028,528
DATED : June 7, 1977
INVENTOR(S) : Daniel Staes

It is certified that error appears in the above-identified patent and that said Letters Patent are hereby corrected as shown below:

Column 2, line 27:

"edge" should be --ledge--

Column 3, line 45, 46

"direction" should be --detection--

Signed and Sealed this

Twentieth Day of September 1977

[SEAL]

Attest:

RUTH C. MASON
Attesting Officer

LUTRELLE F. PARKER
Acting Commissioner of Patents and Trademarks